United States Patent [19]

Denis

[11] Patent Number: 4,556,385

[45] Date of Patent: Dec. 3, 1985

[54] FURNACE WITH REFRACTORY BEAMS

[75] Inventor: Michel Denis, Marly le Roi, France

[73] Assignee: Stein Heurtey S.A., Ris Orangis, France

[21] Appl. No.: 588,860

[22] Filed: Mar. 12, 1984

[30] Foreign Application Priority Data

Mar. 11, 1983 [FR] France ................................ 8304263

[51] Int. Cl.[4] ........................... F27B 9/14; F27B 9/00; B65G 25/02

[52] U.S. Cl. .................................... 432/122; 198/774; 432/144

[58] Field of Search ........................ 432/122, 124, 144; 198/774

[56] References Cited

U.S. PATENT DOCUMENTS

| | | | |
|---|---|---|---|
| 1,400,367 | 12/1921 | McCann | 432/122 |
| 2,325,757 | 8/1943 | Ehlers | 432/122 |
| 3,726,514 | 4/1973 | Fagergren | 432/122 |
| 4,478,573 | 10/1984 | Kitayama et al. | 432/124 |

FOREIGN PATENT DOCUMENTS

| | | | |
|---|---|---|---|
| 2009380 | 6/1979 | United Kingdom | 432/122 |

*Primary Examiner*—John J. Camby
*Attorney, Agent, or Firm*—Karl F. Ross; Herbert Dubno

[57] ABSTRACT

A walking-beam furnace in the heating of metal bodies without bending in which at least a pair of walking beams straddle a stationary beam whose width is greater than that of the walking beams. The stationary beam is formed with a plurality of rectangular recesses opening at a support surface of the stationary beam upon which the metal bodies come to rest and communicate from below with a source of combustion gases so that the hot gas rises to contact the bottom of the metal bodies and the bottom of the metal bodies is subject to heating by radiation from the walls of the recess which converges downwardly to a duct supplying the hot gas. The width of the recess is greater than the widths of the portions of the fixed beam laterally flanking, while the length of the recesses is greater than its width.

4 Claims, 2 Drawing Figures

FURNACE WITH REFRACTORY BEAMS

FIELD OF THE INVENTION

The present invention relates to refractory beam furnaces.

BACKGROUND OF THE INVENTION

Furnaces intended for continuous heating, before rolling, of products such as billets or blooms, are often provided with walking beams. Part of the hearth is formed by fixed beams while the remaining part is constituted by walking beams which have a circular or rectangular movement pattern. The products rest alternately on the fixed beams and on the walking beams the movement of which ensures the progress of these products.

The beams of these furnaces may be hollow and cooled by circulation of water. They may also be made of refractory material, which reduces the heat consumption of the furnace by reducing heat losses.

In furnaces with refractory beams, the heating of the products is principally ensured by the radiation of the furnace on their upper face and on their lateral faces. Their lower face which is constantly in contact with the refractory hearth, is heated only by heat conduction coming from the other faces and, in most of the furnace, is at a temperature lower than that of the rest of the product.

This difference in temperature provokes a difference in expansion of the upper and lower faces of the product, which brings about a bending of the latter in the vertical plane. This bending is detrimental to the advance of the products on the hearth; in fact, the bent products tend to tip and then risk overlapping in the camber of the bend is greater than the interval which separates two successive products.

U.S. Pat. No. 1,400,367 describes a furnace comprising a hearth provided with slots in which are engaged walking beams separated by a fixed beam of width greater than that of the walking beams. Into the lateral walls of the slots open out flues conducting the combustion gases; the latter circulate about the mobile elements of the hearth and avoid passage of cold air through the slots. However, the combustion gases and the smoke leaving through slots which have a limited width cannot effectively heat the lower face of the products to avoid bending thereof. Moreover, the lateral walls of the slots and those of the walking beams are in contact with the smoke and dust that the gas contains; this is a drawback, being given the relative movement of the walls of the slots and of those of the beams.

OBJECT OF THE INVENTION

The present invention has for its object a furnace with refractory beams, with upper heating, which makes it possible to avoid virtually all bending of the products.

SUMMARY OF THE INVENTION

This furnace in which the fixed beams of the hearth have a width greater than that of the walking beams and comprise recesses connected to the general smoke (combustion gas) circuit, is characterized in that the recesses open out on the upper face of the beams so that the combustion gas passes through the bed of products surmounting them.

During use of the furnace, the smoke passes through the bed of products and ensures heating of the lower face of the products, which thus expands virtually like their upper face.

The recesses preferably have a depth decreasing in the direction of displacement of the products. They thus present a flow section increasing within the direction of flow of the combustion gas, which compensates their drop in temperature.

The recesses may have different depths, the depth of one recess being a function of its position with respect to the median longitudinal plane of the furnace. Flows of hot gas beneath the products are thus obtained to ensure a reheating of the lower face of these product which depends on the place of said products with respect to the axis of the furnace. It is thus possible to compensate any dissymmetry of heating of the furnace.

The fixed beams may comprise longitudinal metal sections adapted to support the products and themselves supported by the lower frame of the furnace.

BRIEF DESCRIPTION OF THE DRAWING

By way of non-limiting example, an embodiment of a furnace with refractory beams, improved according to the present invention, has been described hereinafter, with reference to the accompanying drawing, in which.

SPECIFIC DESCRIPTION

Figure 1:
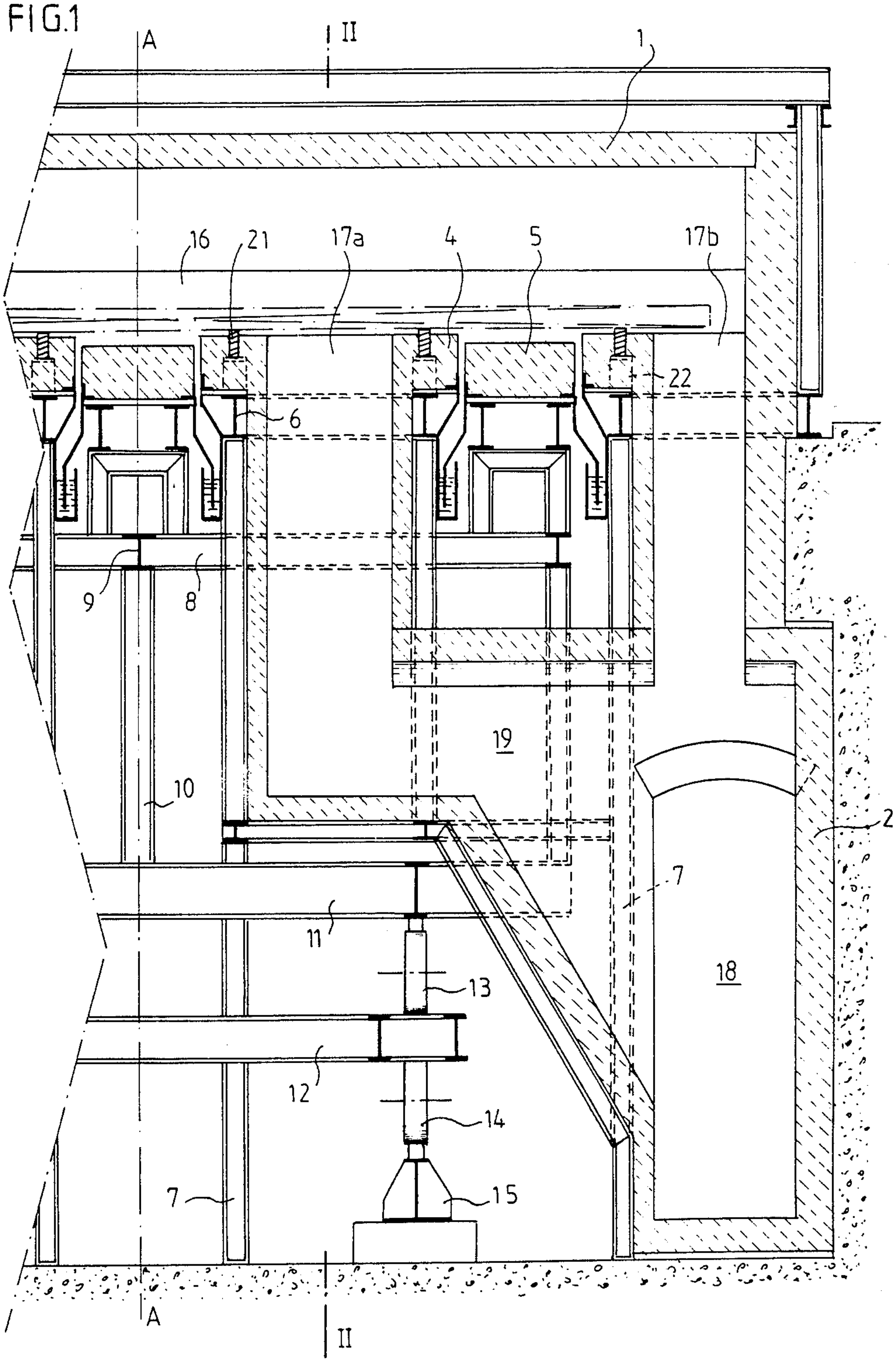
FIG. 1 is a view in transverse section of a half of the furnace.

As shown in the drawing, the furnace comprises a roof 1, lateral walls 2 and a front wall 3 and has a median longitudinal plane A—A. Its hearth is formed by refractory fixed beams 4 separated by refractory walking beams 5 whose widths are less than those of the fixed beams. Burners (not shown) make it possible to circulate combustion gases in counter-flow in the upper zone of the furnace, above the beams 4 and 5.

The fixed beams 4 are supported by metal sections (I-beams) 6 called "under-hearth irons" forming an integral part of the metallic framework of the furnace which is generally designated in the drawing at 7. The walking beams 5 are for their part supported by cross-pieces 8 which, jointly with beams 9, constitute a mobile chassis. This chassis is supported, via uprights 10, by a chassis 11 which rests on a chassis 12 via rolls 13 and upon which a system of jacks (not shown) acts to it possible to displace the chassis 11 longitudinally. The chassis 12 itself rests, via rolls 14, on fixed inclined planes 15 and may be displaced longitudinally by a system of jacks (likewise not shown). By displacing chassis 12, the walking beams 5 are displaced both longitudinally and vertically whilst if chassis 11 is displaced, the walking beams 5 move only longitudinally. By simultaneously displacing chassis 11 and 12, the walking beams 5 may have a circular or rectangular movement imparted thereto, which ensures progress in the direction of arrow F of the products 16 resting on the hearth of the furnace.

Figure 2:
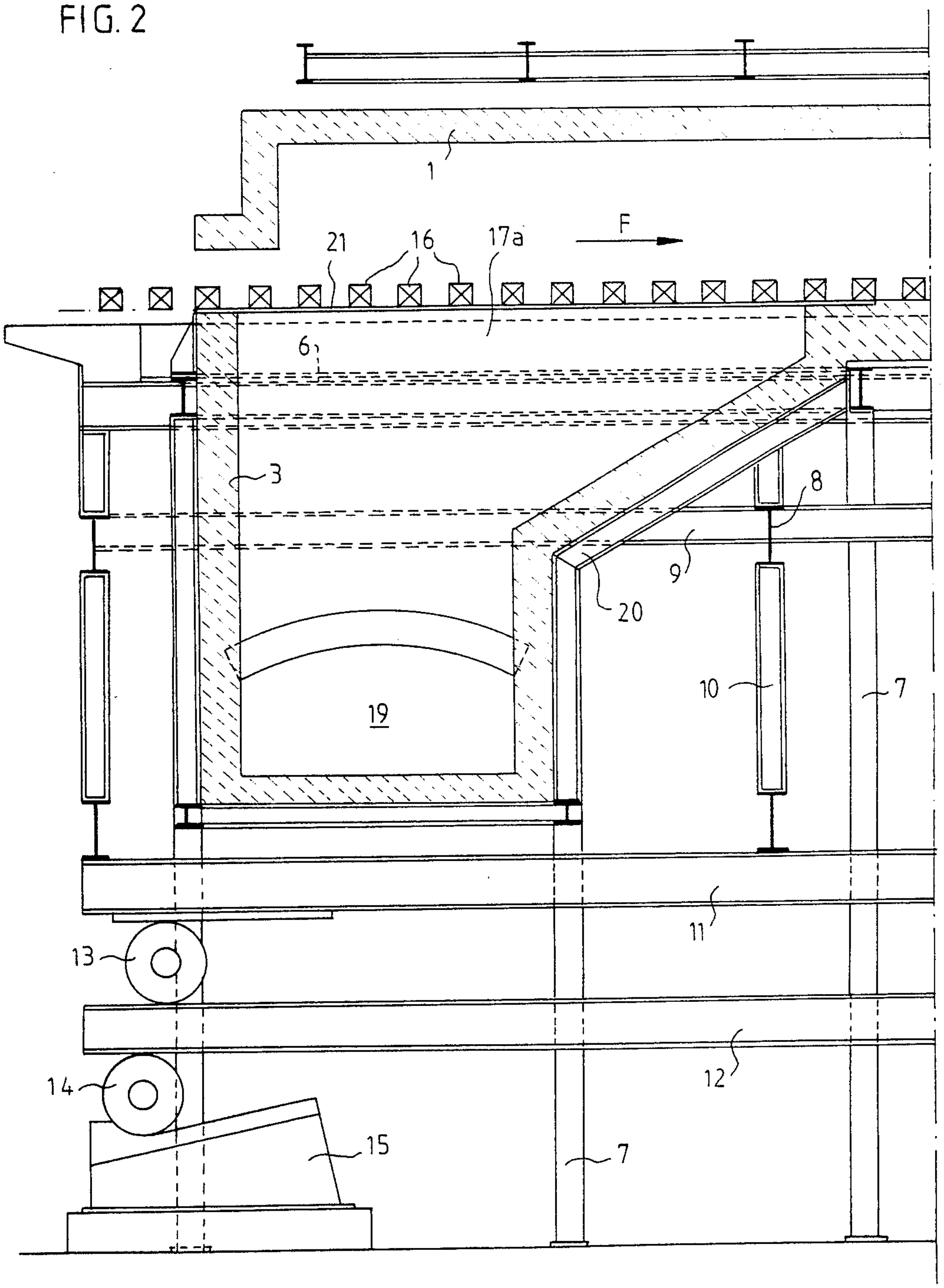
FIG. 2 is a longitudinal section of the batching part of the furnace, along II—II of FIG. 1.

In the first part of the furnace, on the batching side, the fixed beams 4 define recesses such as **17*a* and 17*b* whose depth decreases in the direction of progress of the products, i.e. in the direction of arrow F in FIG. 2. The greatest depth of these recesses therefore lies at the level of batching. In the embodiment shown in the drawing, the recess 17*a* located near the median longitudinal plane A—A has a shallower depth than the recess 17***b*. The various recesses are connected to a manifold 18 via combustion product conduits such as 19 which are supported by a framework 20 forming part of the furnace.

Because of the recesses 17*a* and 17*b* made in the fixed beams, the section of the lateral borders of these beams which support the products 16, is small and incompatible with the pressure exerted on these borders. To overcome this drawback, metallic sections 21, of rectangular cross-section, are disposed in these borders, parallel to the longitudinal axis of the furnace. These sections which serve as support for the products 16 entering in the furnace, rest on the under-hearth irons 6 via supports 22.

During operation, the smoke resulting from combustion passes through the recesses 17*a* and 17*b*, therefore the bed of products to which it gives by convection part of its sensible heat. By thereafter flowing beneath the bed, in the recesses, it radiates on the lower faces of the products which are thus heated.

As the depth of the recesses decreases in the direction of progress of the products, a good distribution is obtained, along the axis of the furnace, of the smoke having passed through the bed of products. Furthermore, the efficiency of the heat radiation on the lower face of the products is maintained as the drop in temperature of the smoke, which circulates in counter-flow, is compensated by an increase in its thickness.

As the depth of the recesses also varies as a function of their positions with respect to the axis of the furnace, as possible dissymmetry in the heating of the furnace may be compensated.

Finally, the lower face of the products 16 is taken virtually to the same temperature as their upper face and expands substantially by the same value. Bending of the products is eliminated or at least considerably reduced.

The products rest level with the fixed beams 4, on the sections 21. The latter may, without inconvenience, be metallic, being given the low temperature which prevails in the furnace in its batching zone.

I claim:

1. In a walking-beam furnace for the heating of metal bodies advanced through said furnace and wherein at least two longitudinally extending walking beams flank a longitudinally extending stationary beam so that said walking beams alternately lift, metal bodies from an upper surface of said stationary beam and deposit said bodies on said surface in advancing said bodies along said beams, the improvement wherein in combination:

said stationary beam has a width greater than that of said walking beams;

said stationary beam is formed with a plurality of generally rectangular recesses opening along said surface and elongated in the longitudinal direction of said stationary beam, said recesses being flanked by portions of said stationary beam of smaller width than the widths of said recesses;

said stationary beam is formed with ducts communicating with said recesses below said surface for the delivery of hot gas to said recesses whereby said hot gas passes upwardly to contact the underside of metal bodies supported by stationary beam; and each recess has a bottom converging toward a respective one of said ducts whereby radiation from said recesses heats the undersides of said bodies.

2. The improvement defined in claim 1 wherein said depths of said recesses varies in said furnace as a function of position with respect to a longitudinal median plane therethrough.

3. The improvement defined in claim 1 wherein the portions of said stationary beam flanking each recess are reinforced by metal sections supported on a frame of said furnace.

4. The improvement defined in claim 3 wherein said beams are composed of refractory material.

* * * * *